May 19, 1925.
E. A. GALLAGHER
MILK PAIL
Filed Aug. 19, 1919
1,538,480
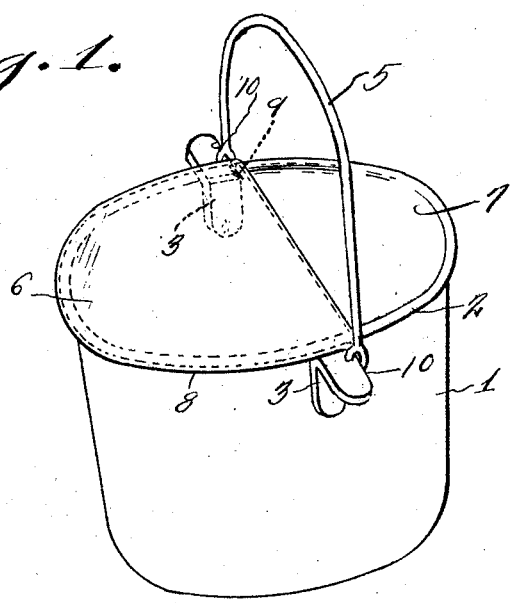
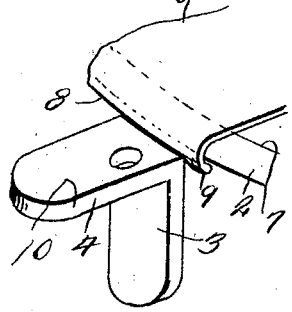
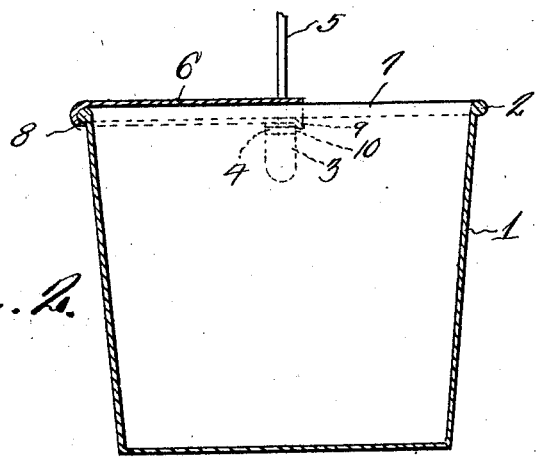
Inventor
E. A. Gallagher
By D. Swift
His Attorney Patented May 19, 1925.

1,538,480

UNITED STATES PATENT OFFICE.

EDWARD A. GALLAGHER, OF MOUNT VERNON, WASHINGTON.

MILK PAIL.

Application filed August 19, 1919. Serial No. 318,564.

*To all whom it may concern:*

Be it known that I, EDWARD A. GALLAGHER, a citizen of the United States, residing at Mount Vernon, in the county of Skagit, State of Washington, have invented a new and useful Milk Pail; and I do hereby declare the following to be a full, clear, and exact description of the invention, such as will enable others skilled in the art to which it appertains to make and use the same.

The invention relates to milk pails and has for its object to provide a pail of this character which may be easily held between the knees of a person while milking, the bail ears being so formed that they may be engaged by the knees, the pail body being preferably oval shaped so as to facilitate the holding of the pail.

A further object is to provide a cover extending over substantially one half the opening of the pail, said cover forming means whereby dust or dirt that may fall from the clothing of the user while milking will be prevented from falling into the pail. The cover being so constructed that the same will fit over and engage the bead of the pail and be prevented from displacement accidentally by the ears of the bail brackets.

With the above and other objects in view, the invention resides in the combination and arrangement of parts as hereinafter set forth shown in the drawing, described and claimed, it being understood that changes in the precise embodiment of the invention may be made within the scope of what is claimed without departing from the spirit of the invention.

In the drawings:—

Figure 1 is a perspective view of the milking pail.

Figure 2 is a sectional view through the milking pail.

Figure 3 is a perspective view of a portion of the pail and cover, showing method of holding the cover from displacement.

Referring to the drawings the numeral 1 designates the body of the pail, which is preferably oval in horizontal cross section. The upper marginal edge of the pail is provided with a bead 2. By forming the pail oval shaped, it will be seen that the same can be easily held between the knees while milking a cow.

The opposite sides of the oval shaped body member 1 has secured thereto by brazing or any other suitable manner, angle brackets 3, the arms 4 thereof being in a horizontal plane and extending outwardly from the sides of the pail, so as to form means for engaging the knees, thereby additionally preventing the downward slipping between the knees of the operator. Arms 4 also form means to which a conventional form of bail 5 may be connected in any suitable manner, by means of which bail the pail may be easily handled.

A cover 6 is provided and is adapted to cover substantially one half of the opening 7 of the pail, said cover being adapted to be disposed next to the body of the operator, thereby preventing dust or dirt that might drop from the operator's clothing from falling in the pail. Cover 6 on its curved edge is provided with an inturned flange 8 which is adapted to engage and fit against the bead 2 of the pail. The ends of the inturned curved flange 8 are provided with bent out portions 9 forming lugs, which lugs when the cover 6 is forced on the bead 2 will spring over the arms 4 of the bracket 3 and engage the sides 10 of the arms 4, thereby providing means for preventing the displacement of the cover 6.

It will be seen that a cover is provided which is simple of construction and can be easily placed on the pail and removed, also that a pail is provided which can be easily held between the knees while milking a cow.

The invention having been set forth what is claimed as new and useful is:—

The combination with the beaded opening of a bucket, said bucket being provided with outwardly extending ears adjacent the under side of the bead of the beaded opening and oppositely disposed, of a cover for said bucket covering substantially half of the bucket, said cover comprising a semi-circular shaped member, a downwardly and inwardly extending flange carried by the cover and adapted to engage the bead of the beaded opening of the bucket, the inner corners of the downwardly and inwardly extending flange being bent downwardly and outwardly, thereby forming spring lugs adapted to engage over the bucket ear sides at the opposite sides thereof to the cover and under the bucket opening bead for holding the cover against displacement.

In testimony whereof I have signed my name to this specification in the presence of two subscribing witnesses.

EDWARD A. GALLAGHER.

Witnesses:
W. L. BRICKEY,
H. W. BRICKEY.